US011920097B2

(12) United States Patent
Orivam De Morais et al.

(10) Patent No.: US 11,920,097 B2
(45) Date of Patent: Mar. 5, 2024

(54) OXY FUEL GAS MIXTURES AND METHODS FOR USE

(71) Applicant: PRAXAIR TECHNOLOGY, INC., Danbury, CT (US)

(72) Inventors: Clayton Orivam De Morais, Amherst, NY (US); Keith G. Pierce, East Amherst, NY (US); Marcos Müller Lobato, Rio de Janeiro (BR)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 194 days.

(21) Appl. No.: 16/762,966

(22) PCT Filed: Nov. 6, 2018

(86) PCT No.: PCT/US2018/059397
§ 371 (c)(1),
(2) Date: May 11, 2020

(87) PCT Pub. No.: WO2019/099239
PCT Pub. Date: May 23, 2019

(65) Prior Publication Data
US 2022/0306954 A1  Sep. 29, 2022

Related U.S. Application Data

(60) Provisional application No. 62/587,713, filed on Nov. 17, 2017, provisional application No. 62/587,561, filed on Nov. 17, 2017.

(51) Int. Cl.
*C10L 3/06* (2006.01)
*C10L 3/02* (2006.01)

(52) U.S. Cl.
CPC .......... *C10L 3/02* (2013.01); *C10L 3/06* (2013.01); *C10L 2200/0277* (2013.01); *C10L 2270/08* (2013.01); *C10L 2290/24* (2013.01)

(58) Field of Classification Search
CPC . C10L 3/06; C10L 2200/0277; C10L 2270/08
See application file for complete search history.

(56) References Cited

U.S. PATENT DOCUMENTS

2013/0032250 A1* 2/2013 Sato ............... F23D 14/42
148/194
2016/0238278 A1* 8/2016 Webb ............. F17C 3/00

FOREIGN PATENT DOCUMENTS

| CA | 2269429 A1 | * | 10/1999 | ............. C10L 3/02 |
| CN | 1724620 A | | 1/2006 | |
| CN | 101 623 798 A | | 1/2010 | |
| CN | 101623798 A | * | 1/2010 | |
| CN | 103868069 A | * | 6/2014 | |
| GB | 205543 A | * | 10/1923 | |

(Continued)

OTHER PUBLICATIONS

Machine Translation of CN-101623798-A (Year: 2010).*

(Continued)

Primary Examiner — Ellen M McAvoy
Assistant Examiner — Ming Cheung Po
(74) Attorney, Agent, or Firm — Ralph J. Mancini

(57) ABSTRACT

Fuel gas compositions for use in metal fabrication are provided comprising fuel gases comprising a base fuel gas mixed with from about 1% to less than 30% hydrogen.

5 Claims, 10 Drawing Sheets

(56) References Cited

FOREIGN PATENT DOCUMENTS

| | | | | |
|---|---|---|---|---|
| GB | 2125818 A | * | 3/1984 | ............... C01B 3/00 |
| JP | S50 49301 A | | 5/1975 | |
| JP | S53 109505 A | | 9/1978 | |
| JP | S5883093 A | | 5/1983 | |
| JP | S58 213092 A | | 12/1983 | |
| JP | 61042592 A | * | 3/1986 | |
| JP | UP S61 42592 A | | 3/1986 | |
| JP | S61 83292 A | | 4/1986 | |
| JP | S6183292 A | | 4/1986 | |
| JP | S61 136593 A | | 6/1986 | |

OTHER PUBLICATIONS

Machine Translation of JP-61042592-A (Year: 1986).*
Machine Translation of CA 2269429 A1 (Year: 1999).*
Machine Translation of CN-103868069-A (Year: 2014).*
BOC: "BOC Guidelines for Welding and Cutting", Mar. 21, 2017, XP055554471, Retrieved from Internet: URL:https://www.boc.com.au/wcsstore/AU_BOC_Industrial_Store/pdf/product/en_AU/Guidelines-for%20Gas-Welding-and-Cutting.pdf, [retrieved on Feb. 11, 2019], pp. 45-46.

* cited by examiner

OXY FUEL GAS MIXTURES AND METHODS FOR USE

RELATED APPLICATIONS

This application claims the benefit of International Application No. PCT/US2018/059397, filed on Nov. 6, 2018, which claimed the benefit of U.S. Provisional Application Ser. No. 62/587,713, filed on Nov. 17, 2017, and U.S. Provisional Application Ser. No. 62/587,561, filed on Nov. 17, 2017, which are incorporated herein by reference.

FIELD OF THE INVENTION

The present disclosure relates generally to the field of fuel gas mixtures. More specifically, the present disclosure relates to fuel gas mixtures containing a base fuel gas and hydrogen and to its use for oxyfuel applications in metal fabrication processes.

BACKGROUND OF THE INVENTION

Oxyfuel gas cutting (OFC) is a group of processes used to cut or remove metals by means of the high temperature exothermic chemical reaction of oxygen with a base metal. OFC and its variations are very important processes used in metal fabrication manufacturing to cut shapes, to cut scraps or to remove metal for repair and maintenance.

The OFC process uses a torch with a tip (nozzle). The torch and tip are used to mix the fuel and the oxygen in the right proportions to produce the preheat flame and to supply a concentrated stream of oxygen to react with the metal at high temperature.

There are two major steps to the oxyfuel cutting process. In the first step the preheat flame is used to heat the metal to its kindling (ignition) temperature. The kindling temperature for steel is the temperature when an iron containing material will undergo exothermic oxidation reactions to generate iron oxides and is the primary mechanism for cutting carbon steels. Once the kindling temperature is reached, a pure stream of oxygen is applied to the material to start the oxidation reaction and the generation of heat. This heat plus the preheat flame sustains the continued oxidation of the metal throughout the cut. The kinetic energy of the oxygen stream expels the metal oxides and molten metal from the cut and moving the torch across the workpiece at a proper speed produces a continuous cutting. The first step of heating the material to the kindling temperature is called preheating/piercing, while the second step of the process is the cutting step.

In addition to cutting, oxy fuels have been used in the metal fabrication industry for welding, flame heating, soldering and brazing of metal parts and workpieces.

In oxy-fuel welding, a welding torch is used to heat and melt the base metal with or without the addition of a filler metal. The molten material from the metal surfaces, and the filler metal, if used, intermix in a common molten pool and coalesce upon cooling.

In oxy-fuel flame heating, a heating torch is used to preheat, or post heat the base metal, either in its entirety or just the region surrounding the joint, to a specific desired temperature, called the preheat temperature, prior to welding or post heat if after the welding.

In oxy-fuel brazing or soldering, a torch is used to heat the base metal and filler metal to a temperature that melts the filler metal without melting the base metal. The filler metal distributes itself between the closely fitted surfaces of the joint by capillary action joining the material. The primary difference between soldering and brazing is the filler metal liquid temperature, with brazing having a higher temperature.

Although cutting, welding, flame heating, soldering and brazing are distinct processes, the description herein will focus on the fuel gas used in a metal cutting process with the understanding that the inventive fuel gas mixtures can be used in any metal fabrication heating process and is not limited to cutting processes.

Although in the metal fabrication processes mentioned above is preferable to use pure oxygen (95% purity or higher) in some cases gas sources having lower amounts of oxygen, like air or compressed air (percentage of oxygen around 21%) have been used for welding, flame heating, soldering and brazing processes. Consequently, with the understanding that, the inventive fuel gas mixtures can be mixed with any source of oxygen to generate the flame and is not limited to be burned only with pure oxygen.

A wide variety of fuel gases are used for oxyfuel applications. It is well known that acetylene ($C_2H_2$) is the most widely used fuel gas for oxyfuel applications due its high combustion intensity, high flame temperature and low oxygen consumption (due to a low oxygen/fuel ratio). However, at temperatures above 1,435° F. (780° C.) or at pressures above 30 psig (207 KPa) acetylene is unstable and explosive decomposition can occur, making acetylene difficult to handle in many common industrial situations and riskier to use. Additionally, the most common method to generate acetylene uses calcium carbide ($CaC_2$) and water, which is a difficult to control reaction that generates significant quantities of solid waste by-product.

While acetylene has excellent performance in most metal cutting applications, it is also typically the most expensive fuel gas making it too expensive for many applications or for use in less developed regions of the world. An alternative to acetylene is Liquid Petroleum Gas (e.g., LPG, which is a mixture of propane ($C_3H_8$), butane ($C_4H_{10}$) and other hydrocarbons) or pure propane.

Both LPG and propane are liquids at modest pressure (under 200 psi) and are easy to use and deliver. While these gases are less expensive than acetylene and easier to handle, the performance of these gases regarding preheating time is very poor when comparing with acetylene, and the ratio of oxygen/fuel is much higher, increasing operation costs.

Natural gas, consisting primarily of methane, is also commonly used as a fuel gas, since it is readily available through extensive pipeline networks in many countries and is currently at low prices. However, the preheating performance of natural gas is also inferior to acetylene.

Pure hydrogen, although it can be used as a fuel gas, is not typically used for oxyfuel applications due its very low heat of combustion and relatively low flame temperature when compared with the other fuel gases mentioned above.

Historically, individuals who want to cut materials using the oxyfuel process typically select the fuel gas based on flame temperature, total heat of combustion and/or the percentage of the heat of combustion released at the primary flame. However, the results of preheating experiments don't demonstrate that the factors listed above (i.e., flame temperature and heat of combustion) alone provide enough or dispositive basis for a conclusive technical comparison between different fuel gases and their effectiveness when used as a fuel gas.

When hydrogen was added to the various fuel gases unexpected improvements in several areas were observed including preheating/piercing time and cutting performance.

Two important factors that can affect the heat transfer efficiency and effectiveness of a fuel gas in an oxyfuel cutting process are the heating value of the fuel gas and the velocity of the oxyfuel flame generated from the combustion process. It is known that although hydrogen has a low heating value compared to other common oxyfuel gases, it has a high combustion velocity when compared with fuel gases such as acetylene, propane, or methane. Based on the results, the benefits of small additions of hydrogen to increase the flame velocity and improve the heat transfer efficiency of the flame outweigh the lower heating value of hydrogen when used as an oxyfuel gas.

SUMMARY OF THE INVENTION

The present invention generally relates to the use of hydrogen with lower-cost base fuel gases to create an alternative to, or an improvement to, acetylene (or other high cost fuel gases) for metal heating processes and particularly for oxy fuel heating processes such as cutting, welding, flame heating, soldering and brazing. The fuel gas mixture performs substantially equivalent to acetylene, or within acceptable performance standards, but without the many cost or processing disadvantages of acetylene and more expensive fuel gases. Surprisingly, fuel gas mixtures comprising the base fuel gas with hydrogen gas in amounts of less than 30%, in another embodiment 1-29% and in another embodiment 5-28%; provide good heating characteristics when used in metal fabrication heating processes.

An aspect of the present disclosure is directed to a method for improving the performance of a fuel gases by increasing the heat transfer efficiency and rates by adding hydrogen in an amount ranging from about 1% to less than 30% by volume. The hydrogen containing fuel gas mixture is preferably used with oxygen in oxy fuel applications and can be delivered to the heating torch in an amount to establish an oxygen-to-fuel gas ratio from above 1:1 to achieve suitable metal heating characteristics.

Another aspect of the present disclosure is directed to a method for cutting a metal workpiece comprising delivering a fuel gas mixture to a cutting torch, with the cutting torch comprising a cutting tip, and with the fuel gas mixture comprising a base fuel gas in an amount ranging from greater than 70% to 99% by volume and hydrogen in an amount ranging from about 1% to less than 30% by volume. The fuel gas mixture and a first oxygen (flame oxygen) are combined and ignited to form a flame exiting from the cutting tip of the cutting torch. The flame is delivered to a predetermined location on the metal workpiece to preheat the metal workpiece to a kindling temperature to form a preheated metal workpiece, followed by delivering a second source of oxygen (cutting oxygen) to the cutting tip to pierce the preheated metal workpiece. Generally, the cutting oxygen or second stream of oxygen is only used for metal cutting purposes.

In another embodiment, the fuel gas mixture is delivered from a single premixed pressurized container.

In a further aspect, the hydrogen containing fuel gas mixtures are provided in which the base fuel gas and hydrogen are each delivered to the cutting torch from a separate source prior to use.

In another embodiment, the present disclosure is directed to a method of heating a metal workpiece during metal fabrication processes such as cutting, welding, flame heating, soldering and brazing using a fuel gas mixture comprising a fuel gas with a base fuel gas component comprising a C1 to C8 hydrocarbon, oxygenated hydrocarbon, or mixtures thereof in an amount ranging from greater than 70% to about 99% by volume and hydrogen in an amount ranging from about 1% to less than 30% by volume. For oxy fuel heating applications, a predetermined amount of oxygen is delivered to the heating torch in an amount required to establish an oxygen to fuel gas ratio of above 1:1 to obtain a suitable preheating or heating temperature. Oxygen is typically delivered to the fuel gas mixture and mixed to form an ignitable gas mixture which is ignited to form a flame.

In another embodiment the invention is directed to a fuel gas mixture for use in a metal heating process, with the fuel gas comprising a base fuel gas selected from C1 to C8 hydrocarbon, oxygenated hydrocarbons and mixtures thereof in an amount ranging from greater than 70% to about 99% by volume, hydrogen in an amount ranging from about 1% to less than 30% by volume, and wherein when oxygen is mixed with the fuel gas mixture to form an oxygen:fuel gas mixture in a ratio of above 1:1.

In a further aspect, the fuel gas mixture is substantially uniformly dispensed from the container at pressures ranging from about 1 bar to about 800 bar.

Another aspect of the present disclosure is directed to a fuel gas container comprising a fuel gas mixture comprising a base fuel gas in an amount ranging from greater than 70% to about 99% by volume and hydrogen ranging from about 1% to less than 30% by volume.

The features, functions and advantages that have been discussed can be achieved independently in various aspects or may be combined in yet other aspects, further details of which can be seen with reference to the following description and the drawings.

DETAILED DESCRIPTION OF THE FIGURES

DETAILED DESCRIPTION OF THE INVENTION

Figure 1:
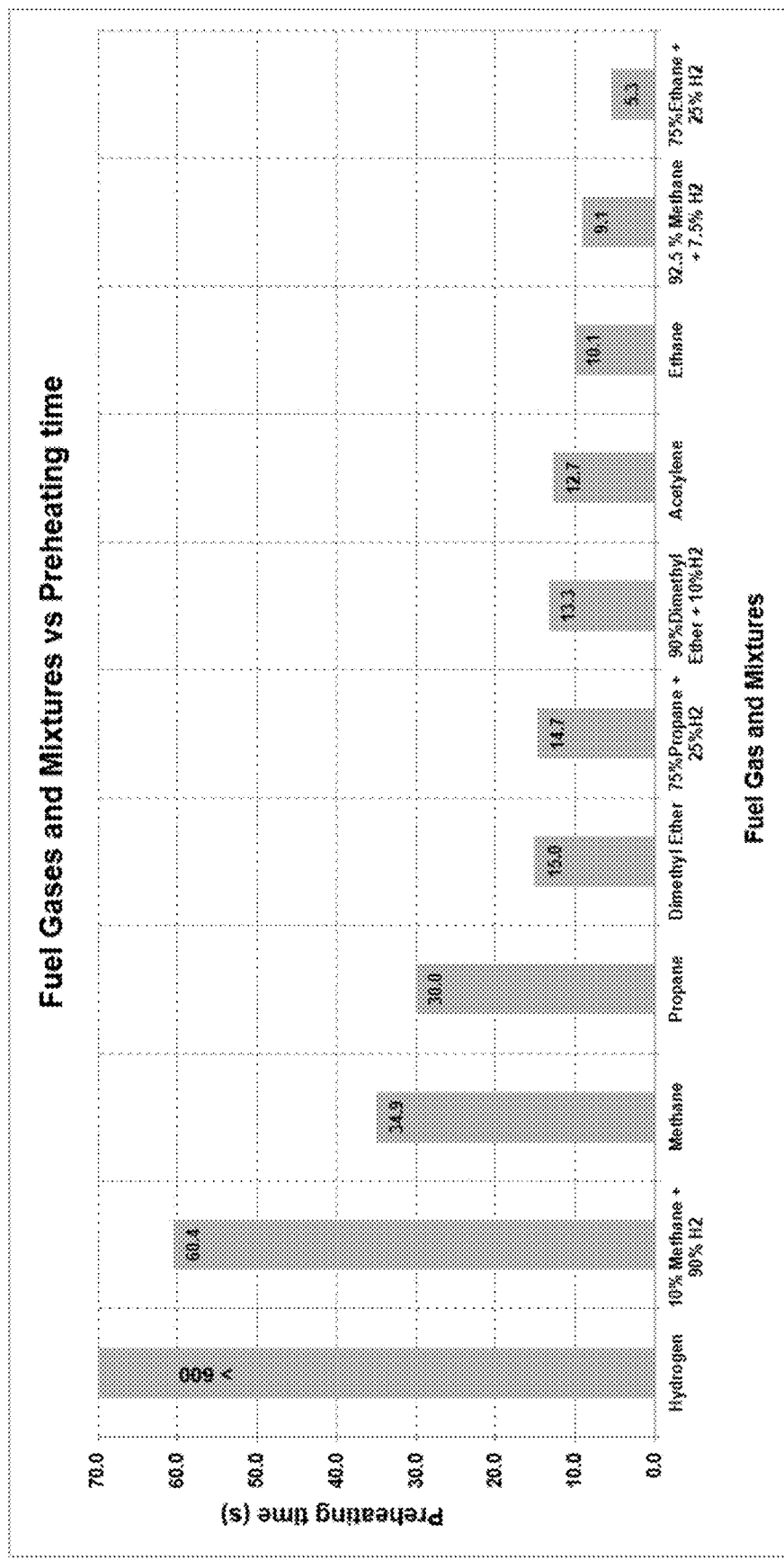
FIG. 1 is a graphic representation of the preheating time for several fuel gases and fuel gases mixtures of interest.

The present invention is directed to lower-cost fuel gas mixtures as alternatives to acetylene and other high cost fuel gases and is used in metal heating processes. These novel fuel gas mixtures are particularly useful in oxy fuel heating processes such as metal cutting, welding, flame heating, soldering and brazing processes. Without intending to limit the application of use and for convenience only, the inventive fuel gas mixtures will be described interchangeably herein as "fuel gas mixtures" or "oxy fuel cutting gas mixtures" with the understanding that oxygen is separately added to the fuel gas to achieve ignition and heating and that the fuel gases can be used in various metal heating processes. The present fuel gas mixtures are preferably used in cutting, welding, flame heating, soldering and brazing processes and most preferably in cutting processes.

Hydrogen has conventionally been considered as having undesirable heating characteristics as compared to acetylene and other commonly used fuel gasses. However, it has now been found that when mixed with certain hydrocarbon gases, oxygenated hydrocarbons, or mixtures thereof hydrogen in amounts of from about 1% to less than 30%, in another embodiment from about 1-29% %, in yet another embodiment from about 5-27% and in yet another embodiment from about 10-25%; can provide fuel gas mixtures with satisfactory heating characteristics for metal fabrication heating applications. Base fuel gas is typically present at least in amounts of greater than 70% by volume, in another embodiment from about 70-99% by volume.

As used herein, the base fuel gas is any hydrocarbon, oxygenated hydrocarbon, or mixtures thereof that can, when combined with hydrogen, be suitably utilized as a fuel gas mixture for cutting metal workpieces.

The invention exploits lower-cost fuel gas mixtures previously thought to be undesirable for use as a fuel gas for oxy fuel heating processes and particularly in cutting, welding, flame heating, soldering and brazing processes due to the comparatively long preheating times. Hydrogen gas also has undesirable heating characteristics as compared to acetylene and other common fuel gases. However, it has now been found that when mixed with base fuel gas, hydrogen in amounts of from 1% to less than 30%, in another embodiment from 1% to less than 29% and in another embodiment from about 10-25% or less, provide fuel gas mixtures with satisfactory heating characteristics for metal fabrication heating applications.

Suitable base fuel gases include, but are not limited to C1 to C8 hydrocarbons, oxygenated hydrocarbons and mixtures thereof. The hydrocarbons include C1 to C8 alkanes, including but not limited to methane, ethane, propane, and butane; C2 to C8 alkenes including but not limited to ethylene, propylene, and butylene; and C2 to C8 alkynes including but not limited to acetylene/ethyne, propyne, and butyne; and mixtures thereof (such as MAPP gases), natural gas, and the like. The hydrocarbons can be both substantially pure gases, mixtures of hydrocarbon gases and may include small amounts of substantially inert components or impurities but will contain over 50% by volume of one or more of the base fuel gas.

C1 to C8 hydrocarbon fuels that contain oxygen are also suitable to use as the base fuel gases. Examples of such base fuel gases include but are not limited to ethers such as dimethyl ether, alcohols such as methanol, ethanol, propanol, ketones, aldehydes and mixtures thereof. In one embodiment these fuel gases will be in a gaseous state at ambient temperatures or liquids with sufficiently high vapor pressures to make their use as a fuel gas viable. The oxygenated hydrocarbons may be both substantially pure, in mixtures and include small amounts of substantially inert components or impurities but will contain over 50% by volume of one or more of base fuel gas.

According to the present invention, useful hydrogen containing fuel gas mixtures are provided which comprise small amounts of hydrogen ranging from about 1% to less than 30% by volume. The addition of hydrogen has been found to improve the heat transfer efficiency of the hydrocarbon fuel gas. It has been further found that concentrations of hydrogen above 30% will reduce the heat value of the fuel gas mixture so it becomes important to combine hydrogen in concentrations that don't substantially reduce the heat values of the hydrocarbon fuel gas employed. Ethane is the exception, with addition rates of up to 50% hydrogen being found to be effective. The use of hydrogen permits the effective use of known base fuel gases which have not been previously thought useful in cutting, welding, flame heating, soldering and brazing applications. The selective use of hydrogen provides for the use of lower cost, lower performance hydrocarbon gases when compared to the cost and performance of acetylene. Thus, the performance of known base fuel gases can be improved to a satisfactory level when used in metal heating, and particularly in oxy fuel metal cutting, processes.

In one embodiment the invention comprises oxy fuel cutting gas mixtures comprising greater than 70% up to 99% natural gas and amounts of hydrogen (with a purity typically greater than 99%) ranging from about 1% to less than 30% by volume. In another embodiment the oxy fuel cutting gas mixtures comprise from about 2% to 29% by volume of hydrogen and from about 71% to about 98% natural gas by volume. In another embodiment the oxy fuel cutting gas mixtures comprise from about 3% to about 25% by volume of hydrogen and from about 75% to about 97% natural gas by volume. In yet another embodiment the oxy fuel cutting gas mixtures comprise from about 5% to about 15% by volume hydrogen and from about 85% to about 95% natural gas by volume. The natural gas component typically comprises methane in amounts of at least 85% by volume and up to 100% methane, but natural gas typically includes other normally occurring hydrocarbons as well as small amounts of nitrogen, carbon dioxide, carbon monoxide and sulfur containing compounds. Typically, the natural gas contains about 85% to about 95% methane and preferably will be at least 90% methane by volume. At these concentrations, varying amounts of methane in the natural gas have no significant effect on the heating characteristics of the fuel gas mixtures. The terms "methane" and "natural gas" are therefore used interchangeably herein.

In another embodiment the invention comprises oxy fuel cutting gas mixtures comprising greater than 70 and up to 99% ethane and amounts of hydrogen (with a purity typically greater than 99%) ranging from about 1% to less than 30% by volume. In another embodiment the oxy fuel cutting gas mixtures comprise from 70.1-99% ethane as a base fuel gas and from about 1-29.9% hydrogen; in another embodiment from about 2% to about 25% by volume of hydrogen and from about 75% to about 98% ethane by volume. In another embodiment the oxy fuel cutting gas mixtures comprise from about 3% to about 15% by volume of hydrogen and from about 85% to about 97% ethane by volume. In yet another embodiment the oxy fuel cutting gas mixtures comprise about 5 to about 10% by volume hydrogen and about 90-95% ethane by volume.

It has also been found that with ethane, benefits are realized at hydrogen addition rates of up to 50% by volume. Similar benefits with other fuel gases were not observed at hydrogen addition rates above 30%.

In another embodiment the invention comprises oxy fuel cutting gas mixtures comprising greater than about 70% and up to 99% propane and from about 1% to less than 30% by volume hydrogen. In another embodiment the oxy fuel cutting gas mixtures comprise from about 5% to 29% by volume of hydrogen and from about 71% to about 95% propane by volume. In another embodiment the oxy fuel cutting gas mixtures comprise from about 15% to about 25% by volume of hydrogen and from about 75% to about 85% propane by volume. In yet another embodiment the oxy fuel cutting gas mixtures comprise about 25% by volume hydrogen and about 75% propane by volume.

In another embodiment the invention comprises oxy fuel cutting gas mixtures comprising from about 88 to about 99% dimethyl ether and from about 1% to 12% by volume hydrogen. In another embodiment the oxy fuel cutting gas mixtures comprise from about 5% to about 12% by volume of hydrogen and from about 88% to about 95% dimethyl ether by volume. In yet another embodiment the oxy fuel cutting gas mixtures comprise about 10% by volume hydrogen and about 90% dimethyl ether by volume.

In addition, the hydrogen containing fuel gas mixtures disclosed herein can provide adequate heating or preheating and often reduce oxygen consumption and operating costs when used in metal cutting and oxy fuel metal cutting processes. The use of hydrogen in the amounts specified by the invention can also provide for fuel gases that are more environmentally friendly and safer during storage, transportation and use than some of the traditional oxy fuel gases like acetylene.

The oxy fuel cutting gas mixtures disclosed herein minimize preheating time, minimize preheating fuel gas consumption and minimize operating costs in oxy fuel cutting processes, while being environmentally friendly and safe during storage, transportation and use in oxy fuel heating processes. The fuel gas mixtures of the invention can be supplied in refillable pressurized containers (e.g., cylinder, tanks, etc.), or the individual components of the fuel gas mixture can be supplied from separate sources and blended together at the point of use using mixing equipment that allows the generation of the gas mixture from separate gaseous components. Normally in oxy fuel heating applications, oxygen will be mixed at the tool prior to ignition as known in the industry. The terms "oxy fuel cutting process" as used herein includes either or both of the preheating/piercing stage and the subsequent cutting stage.

In one embodiment, these hydrocarbon/hydrogen fuel gas mixtures are used in oxy fuel applications, for example, in metal cutting, welding, flame heating, soldering and brazing applications. These applications are the most demanding heating processes in metal fabrication and satisfactory performance in these applications will provide fuel gas mixtures that are adequate for most other metal heating processes.

It has now been discovered that oxy fuel cutting gases comprising mixtures amounts of hydrogen and base fuel gases provide unexpected superior performance as a potential replacement for acetylene in oxy fuel metal fabrication heating processes such as cutting, welding, flame heating, soldering and brazing processes. Two important factors that affect the heat transfer efficiency and effectiveness of an oxy fuel gas in metal fabrication processes of interest are the heating value of the fuel gas and the velocity of the oxy fuel flame generated from the combustion process. The heating value of the gas is represented by a number of variables specific to a fuel gas mixture, such as flame temperature and heat of combustion. Flame temperature is the temperature that results from a complete combustion process that occurs without any work, heat transfer or changes in kinetic or potential energy. The heat of combustion of a hydrocarbon is the sum of the primary and secondary flame heat. The primary flame heat is generated in the inner zone of the flame (inner cone), where fuel gas plus oxygen supplied from the torch react and form carbon monoxide and hydrogen. The secondary flame heat is generated in the outer envelope of the flame, where the carbon monoxide and hydrogen burn with remained oxygen from the torch plus the carbon monoxide and hydrogen burn with oxygen from surrounding air and forms carbon dioxide and water vapor.

The flame velocity is the velocity at which a flame front travels through the adjacent unburned gas. It influences the size and temperature of the primary flame. Combustion velocity also affects the velocity at which gases may flow from the torch tip without causing flame standoff or backfire. It is known that although hydrogen has a very low heating value compared to other common oxy fuel gases, it has a high combustion velocity of the flame (11.5 m/s) when compared with other gases, such as acetylene (6.9 m/s), propane (3.8 m/s), or methane. Further, as disclosed herein, hydrogen mixed with base fuel gases in the desired ratios produces a gas mixture having a higher heat transfer efficiency. Based on the results presented here, it appears that the benefits of small additions of hydrogen to increase the flame velocity and improve the heat transfer efficiency of the flame outweigh the lower heating value of hydrogen when used as an oxy fuel gas.

Metal heating processes used in metal fabrication include cutting, welding, flame heating, soldering and brazing processes and can include metal shaping and bending applications. These processes are well known. The present fuel gas mixtures can be employed in these processes in place of conventional and more expensive fuel gases, such as acetylene, MAPP, and the like as will be understood by the skilled person. When used in oxy fuel heating processes, the oxygen supplied to the process should be at least 95% pure and in another embodiment at least 99.5% pure. In the cutting process, oxygen is used to achieve ignition to produce the flame for preheating (flame oxygen) and used again or boosted in the cutting processes (cutting oxygen).

As mentioned above, the inventive fuel gas mixtures can be supplied to these processes in premixed refillable containers, such containers generally known in the metal fabrication industry and include bulk containers or cylinders. The cylinders are typically pressurized and generally contain one or more mechanical components including valves, such as non-return valves or check valves and/or regulators. The containers have gas supply means such as gas hoses or other supply systems to deliver the fuel gas mixtures to the torch or automated tool. The oxygen, when employed, is supplied separately through another container with similar components and normally under pressure. In the case of smaller containers, such as cylinders, the gas mixture may be provided in a single premixed container to be substantially uniformly dispensed from the container under pressure ranging from about 1 bar to about 800 bar at substantially ambient temperatures. The fuel gas mixture can also be supplied from separate containers, normally under pressure, and mixed in the proper concentrations directly at the tool or torch assembly prior to use using conventional gas mixing systems.

The metal heating processes can employ any torch as generally known in the industry such as welding or cutting torches. For example, the welding torch may have one or two conduits running to the nozzle and valve knobs at the bottom of the handle letting the operator adjust the flow of each of the oxygen and fuel gas mixture, but without an oxygen-blast mechanism or trigger. The cutting torch is similar to a welding torch but will have an oxygen blast trigger or lever. Other torches known in the industry include a rose bud torch or an injector torch and most of such torches can be adjusted for heating, soldering and brazing applications.

The following experiment was conducted according to and in concert with an instrumented testing apparatus. A Koike machine torch model 500L [available from Koike Aronson, located at 635 West Main St. Arcade, New York 14009] was used with a standard Koike cutting tip model #2 (¾"). The apparatus included the Koike machine torch model 500L with a torch igniter, a fixture to hold the metal workpiece, mass flow meters and a data acquisition system (DAQ) used to conduct the preheating tests and to determine reproducibility. The DAQ was used in concert with software to control flame ignition, fuel gas and oxygen supplied to the torch. The DAQ allowed entering a preselected preheating time in seconds (s). Once the system was assembled, a spark igniter was activated, and flame fuel and oxygen solenoids were activated to open valves releasing flame fuel gases and flame oxygen to start the preheating flame. A pierce oxygen solenoid was opened after preselected preheating times were achieved to provide piercing/cutting oxygen. Small metal workpieces known as coupons were placed on the fixture. The coupons were each made of carbon steel.

The test apparatus was mounted onto a mechanized cutting table. Prior to preheating testing with different fuel gases and fuel gas mixtures, preheating tests were conducted to statistically validate the experimental apparatus and testing methodology. All statistically analyses were conducted using Minitab® 17 software. Testing was further conducted to define the number of replications and repetitions necessary for each set of parameters (e.g., fuel gas, pressure, flow, standoff, etc.) for desired repeatability. It was determined that for a 95% confidence level, six (6) repetitions with no replications was desired (i.e. 6 preheat/pierces in a row).

For each fuel gas evaluated the flame parameters were set to achieve a neutral flame (by visual observation of the flame). The experimentally determined preheating time, was the time required to obtain pierces 6 times in a row. For each fuel gas evaluated, the following parameters were observed and kept constant:

Base material thickness=¾"
Torch standoff=flame tip touching coupon
Torch position for piercing=Center
Test coupon size=5"×5"×¾"
Test coupon temperature: room temperature (70° F. to 90° F.)
Test coupon surface finish=mill scale, free of dusty
Gases pre-flow time=5 sec and Cutting oxygen time: 3 sec.

Example 1

Pure Fuel Gases and Its Mixtures With Hydrogen

Preheating tests were conducted using ASTM A36 carbon steel base metal to compare the preheating performance and flame oxygen consumption of gas mixtures comprising a base fuel with addition of hydrogen versus acetylene, ethane, dimethyl ether, propane, hydrogen and methane. As can be seen in Table 1, the preheating time (in seconds, "s") for acetylene was 12.7 s; propane was 30.0 s; and methane was 34.9 s. However, surprisingly, the preheating time for a mixture of 7.5% $H_2$/92.5% Methane was 9.1 s and for a mixture of 25% $H_2$/75% Propane was 14.7 s.

TABLE 1

| Fuel Gas and Mixtures | Preheating Parameters | | | | Gases consumption for preheating | |
| --- | --- | --- | --- | --- | --- | --- |
| | | Fuel | Flame $O_2$ | | | |
| | Preheating time (s) | Flowrate ($m^3$/h) | Flowrate ($m^3$/h) | Oxygen/Fuel Ratio | Fuel ($m^3$) | Flame $O_2$ ($m^3$) |
| Hydrogen | 600.0 | 0.70 | 0.38 | 0.5 | 0.1167 | 0.0633 |
| Methane | 34.9 | 0.70 | 1.12 | 1.6 | 0.0068 | 0.0109 |
| Propane | 30.0 | 0.36 | 1.27 | 3.5 | 0.0030 | 0.0106 |
| Ethane | 10.1 | 0.7 | 2.17 | 3.1 | 0.0020 | 0.0061 |
| Dimethyl Ether | 15.0 | 0.51 | 1.38 | 2.7 | 0.0021 | 0.0058 |
| 10% Methane + 90% H2 | 60.4 | 0.70 | 0.32 | 0.5 | 0.0117 | 0.0054 |
| 75% Propane + 25% H2 | 14.7 | 0.36 | 1.16 | 3.2 | 0.0015 | 0.0047 |
| 90% Dimethyl Ether + 10% H2 | 13.3 | 0.51 | 1.26 | 2.5 | 0.0019 | 0.0046 |
| 92.6% Methane + 7.5% H2 | 9.1 | 0.7 | 1.27 | 1.8 | 0.0018 | 0.0032 |
| 75% Ethane + 25% H2 | 5.3 | 0.7 | 1.84 | 2.6 | 0.0010 | 0.0027 |
| Acetylene | 12.7 | 0.43 | 0.48 | 1.1 | 0.0015 | 0.0017 |

According to an aspect of the present disclosure, a graphic representation of the piercing time for several fuel gases and fuel gases mixtures of interest is presented as FIG. 1. As shown in FIG. 1, the flame performance of 100% hydrogen ($H_2$) drops to levels considered unacceptable for use as an oxy fuel cutting gas. Also shows that the addition of 7.5% hydrogen ($H_2$) in methane, 25% hydrogen ($H_2$) in propane, 10% hydrogen ($H_2$) in dimethyl ether and 25% hydrogen ($H_2$) in ethane, increases the heat transfer efficiency and reduces the preheating time to values below the value for methane, propane, dimethyl ether and ethane, respectively.

Figure 2:
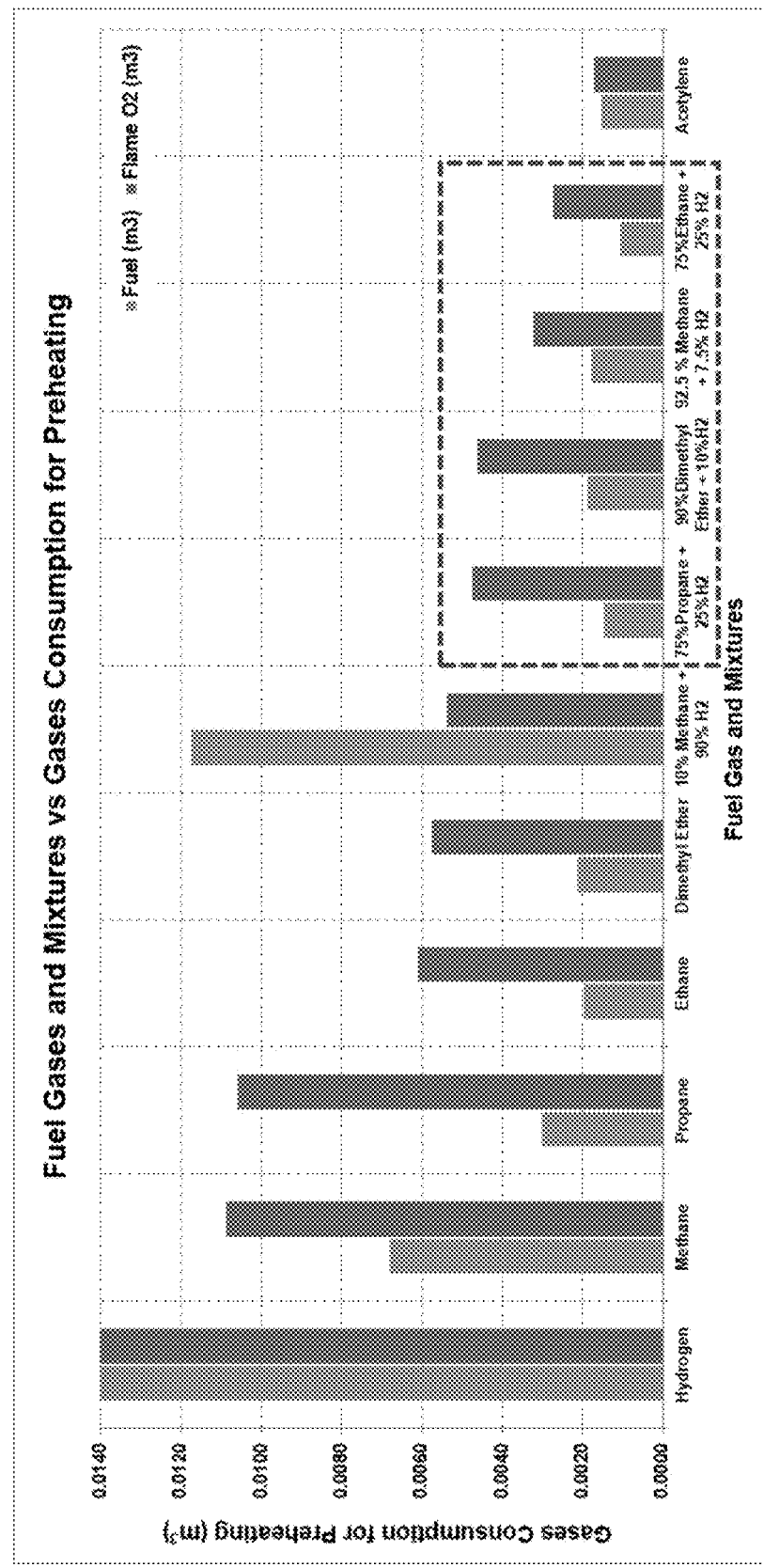
FIG. 2 is a graphic representation of the fuel and flame oxygen consumption during preheating tests for several fuel gases and fuel gases mixtures of interest.

According to the present disclosure, a graphic representation of the flame oxygen consumption for several fuel gases and fuel gases mixtures of interest is presented at FIG. 2. As shown in FIG. 2 and in Table 1, the flame oxygen consumption to preheat the ¾" thickness of carbon steel plate was 0.0109 $m^3$ for methane, 0.0106 $m^3$ for propane, 0.0061 $m^3$ for ethane and 0.0058 $m^3$ for dimethyl ether. However, by adding 7.5% hydrogen to methane, 25% hydrogen to propane, 25% hydrogen to ethane and 40% hydrogen to dimethyl ether, the actual flame oxygen consumption to achieve the preheating was substantially reduced to values of 0.0032 $m^3$ for 7.5% $H_2$/92.5% Methane, 0.0047 $m^3$ for 25% $H_2$/75% Propane, 0.0027 $m^3$ for 25% $H_2$/75% Ethane and 0.0046 $m^3$ for 10% $H_2$/90% Dimethyl Ether.

Example 2

Natural Gas/Methane ($CH_4$) and Its Mixtures

Preheating tests were conducted using ASTM A36 carbon steel base metal to compare the preheating performance and flame oxygen consumption of gas mixtures comprising methane with different amounts of hydrogen. The preheating time performance and the fuel and flame oxygen flowrates and consumption can be seen in Table 2.

Figure 3:
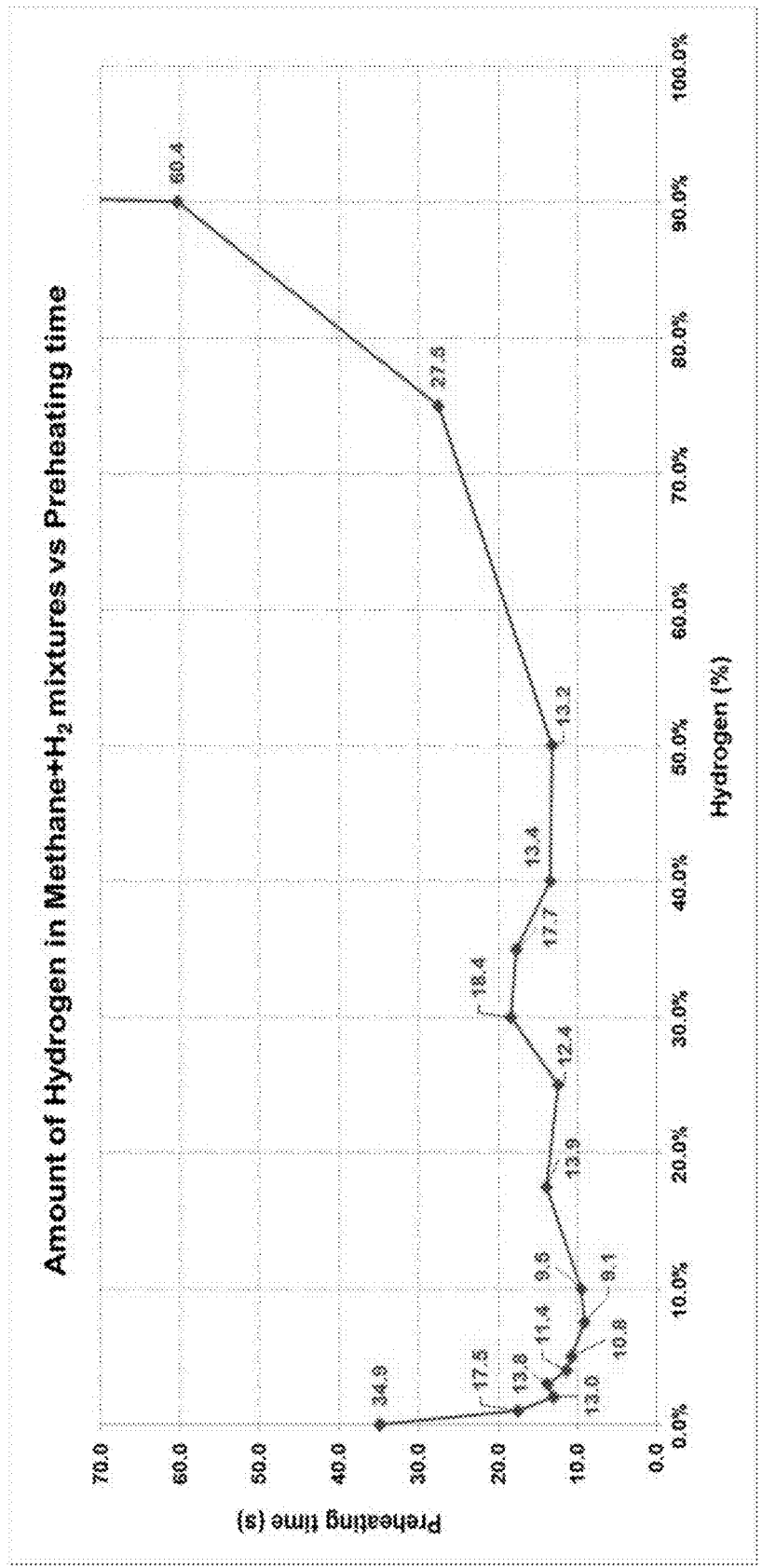
FIG. 3 shows the preheating time results for methane+hydrogen mixtures.

According to the present disclosure, a graphic representation of the piercing time improvement through the increase in the hydrogen ($H_2$) used in the $H_2/CH_4$ mixtures of interest is presented as FIG. 3. As shown in FIG. 3, as the amount of hydrogen in the mixture increases up to 75%, the preheating time decreases below that observed for the 100% methane sample. The addition of 1% to 17.5% of hydrogen in methane could reduce the preheating time in the range of 21% to 74%, confirming the superior efficiency of the heat transfer when hydrogen is mixed with a C1 hydrocarbon. The best performance was achieved when 5% to 10% of hydrogen was added to the mixture.

tion to preheat the ¾" thickness of carbon steel plate was 0.0109 $m^3$ for methane. However, by adding 1% hydrogen to 75% hydrogen, the actual flame oxygen consumption to achieve the preheating was substantially reduced to values at the range of 0.0059 $m^3$ to 0.0031 $m^3$.

Example 3

Propane ($C_3H_8$) and Its Mixtures

Preheating tests were conducted using ASTM A36 carbon steel base metal to compare the preheating performance and flame oxygen consumption of gas mixtures comprising propane with different amounts of hydrogen. The preheating time performance and the fuel and flame oxygen flowrates and consumption can be seen in Table 3.

TABLE 2

| Fuel Gas Composition (vol. %) | | Preheating Parameters | | | | Gases consumption for preheating | |
| --- | --- | --- | --- | --- | --- | --- | --- |
| Methane ($CH_4$) | Hydrogen ($H_2$) | Preheating time (s) | Fuel Flowrate ($m^3/h$) | Flame $O_2$ Flowrate ($m^3/h$) | Oxygen/Fuel Ratio | Fuel ($m^3$) | Flame $O_2$ ($m^3$) |
| 100.0% | 0.0% | 34.9 | 0.70 | 1.12 | 1.8 | 0.0068 | 0.0109 |
| 99.0% | 1.0% | 17.5 | 0.70 | 1.21 | 1.7 | 0.0034 | 0.0059 |
| 98.0% | 2.0% | 13.0 | 0.70 | 1.21 | 1.7 | 0.0025 | 0.0044 |
| 97.0% | 3.0% | 13.8 | 0.70 | 1.20 | 1.7 | 0.0027 | 0.0046 |
| 96.0% | 4.0% | 11.4 | 0.70 | 1.17 | 1.7 | 0.0022 | 0.0037 |
| 95.0% | 5.0% | 10.8 | 0.70 | 1.17 | 1.7 | 0.0021 | 0.0035 |
| 92.5% | 7.5% | 9.1 | 0.70 | 1.24 | 1.8 | 0.0018 | 0.0031 |
| 90.0% | 10.0% | 9.5 | 0.70 | 1.19 | 1.7 | 0.0018 | 0.0031 |
| 82.5% | 17.5% | 13.9 | 0.70 | 1.08 | 1.5 | 0.0027 | 0.0042 |
| 76.0% | 25.0% | 12.4 | 0.70 | 1.04 | 1.5 | 0.0024 | 0.0036 |
| 70.0% | 30.0% | 18.4 | 0.70 | 0.98 | 1.4 | 0.0038 | 0.0050 |
| 65.0% | 35.0% | 17.7 | 0.70 | 0.99 | 1.4 | 0.0034 | 0.0049 |
| 60.0% | 40.0% | 13.4 | 0.70 | 0.92 | 1.3 | 0.0026 | 0.0034 |
| 50.0% | 50.0% | 13.2 | 0.70 | 0.84 | 1.2 | 0.0026 | 0.0031 |
| 25.0% | 75.0% | 27.5 | 0.70 | 0.48 | 0.7 | 0.0053 | 0.0037 |
| 10.0% | 90.0% | 60.4 | 0.70 | 0.32 | 0.5 | 0.0117 | 0.0054 |
| 0.0% | 100.0% | 600.0 | 0.70 | 0.38 | 0.5 | 0.1167 | 0.0833 |

As the data show, amounts of hydrogen up to 75% by volume mixed with methane provides a fuel gas exhibiting good heating characteristics for metal fabrication processes such as cutting and welding. But when the hydrogen concentration in a hydrogen ($H_2$)/methane ($CH_4$) fuel gas mixture exceeds 75 percent, the flame performance appears to drop to levels not considered optimal for use as an oxy fuel cutting gas. Hydrogen concentrations as low as about 1% have been found to improve the heating characteristics of the fuel gas.

Figure 4:
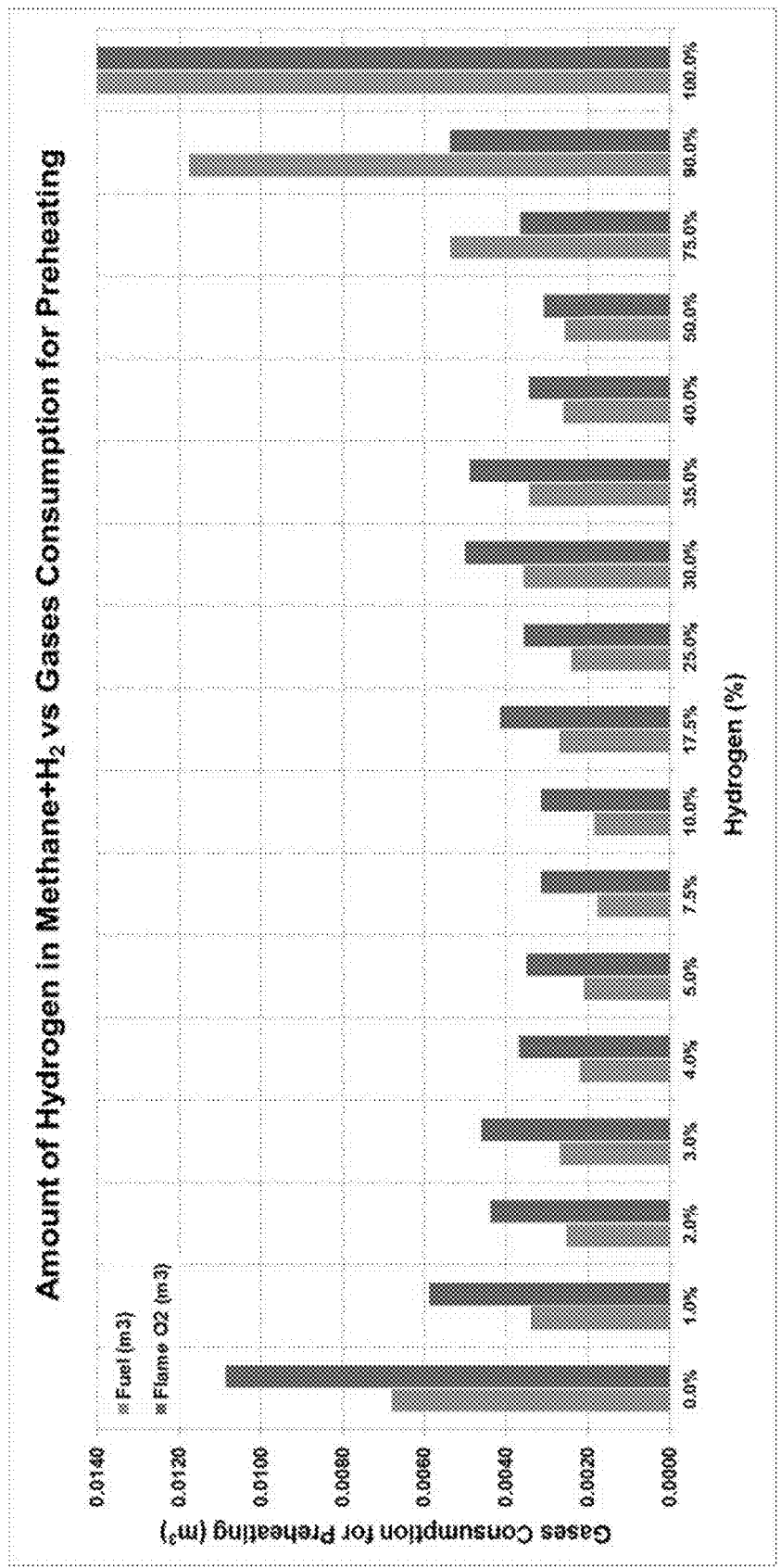
FIG. 4 shows the fuel and flame oxygen consumption during preheating tests for methane+hydrogen mixtures
Figure 5:
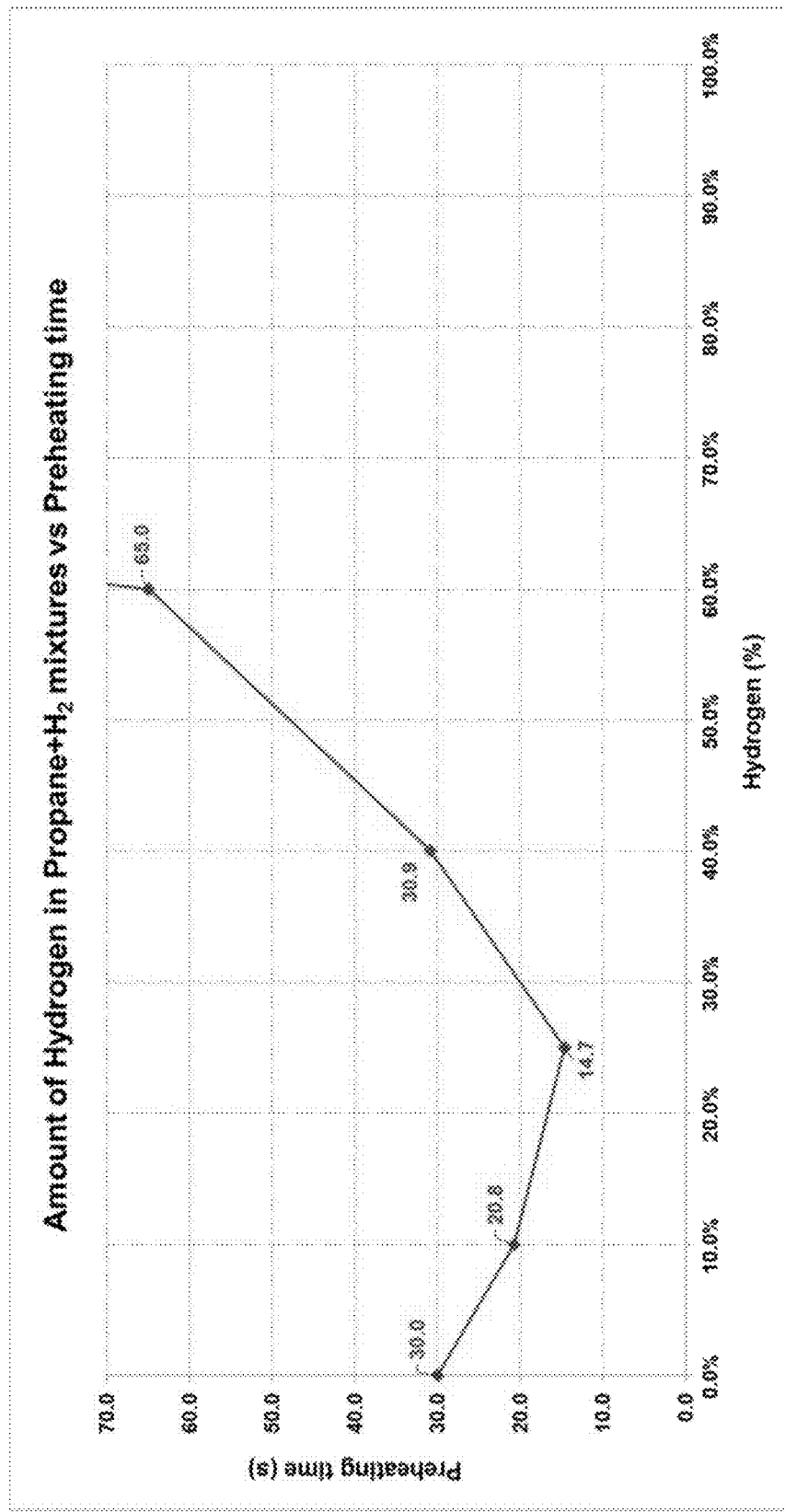
FIG. 5 shows the preheating time results for propane+hydrogen mixtures.

According to the present disclosure, a graphic representation of the fuel and flame oxygen consumption for the $H_2$/Methane mixtures of interest is presented as FIG. 4. As shown in FIG. 4 and in Table 2, the flame oxygen consump- According to the present disclosure, a graphic representation of the piercing time improvement through the increase in the hydrogen ($H_2$) used in the $H_2$/Propane mixtures of interest is presented as FIG. 5. As shown in FIG. 5, as the amount of hydrogen in the mixture increases up to 35%, the preheating time decreases below that observed for the 100% propane sample. The addition of 10% and 25% of hydrogen in propane could reduce the preheating time in 44% and 51% respectively, confirming the superior efficiency of the heat transfer when hydrogen is mixed with a C3 hydrocarbon. The best performance was achieved when 25% of hydrogen was added to the mixture.

TABLE 3

| Fuel Gas Composition (vol. %) | | Preheating Parameters | | | | Gases consumption for preheating | |
| --- | --- | --- | --- | --- | --- | --- | --- |
| Propane ($C_3H_8$) | Hydrogen ($H_2$) | Preheating time (s) | Fuel Flowrate ($m^3/h$) | Flame $O_2$ Flowrate ($m^3/h$) | Oxygen/Fuel Ratio | Fuel ($m^3$) | Flame $O_2$ ($m^3$) |
| 100.0% | 0.0% | 30.0 | 0.36 | 1.27 | 3.5 | 0.0030 | 0.0106 |
| 90.0% | 10.0% | 20.8 | 0.36 | 1.20 | 3.3 | 0.0021 | 0.0069 |
| 75.0% | 25.0% | 14.7 | 0.36 | 1.16 | 3.2 | 0.0015 | 0.0047 |
| 60.0% | 40.0% | 30.9 | 0.36 | 0.92 | 2.6 | 0.0031 | 0.0079 |
| 40.0% | 60.0% | 65.0 | 0.36 | 0.80 | 2.2 | 0.0065 | 0.0144 |
| 0.0% | 100.0% | 600.0 | 0.70 | 0.38 | 0.5 | 0.1167 | 0.0633 |

Figure 6:
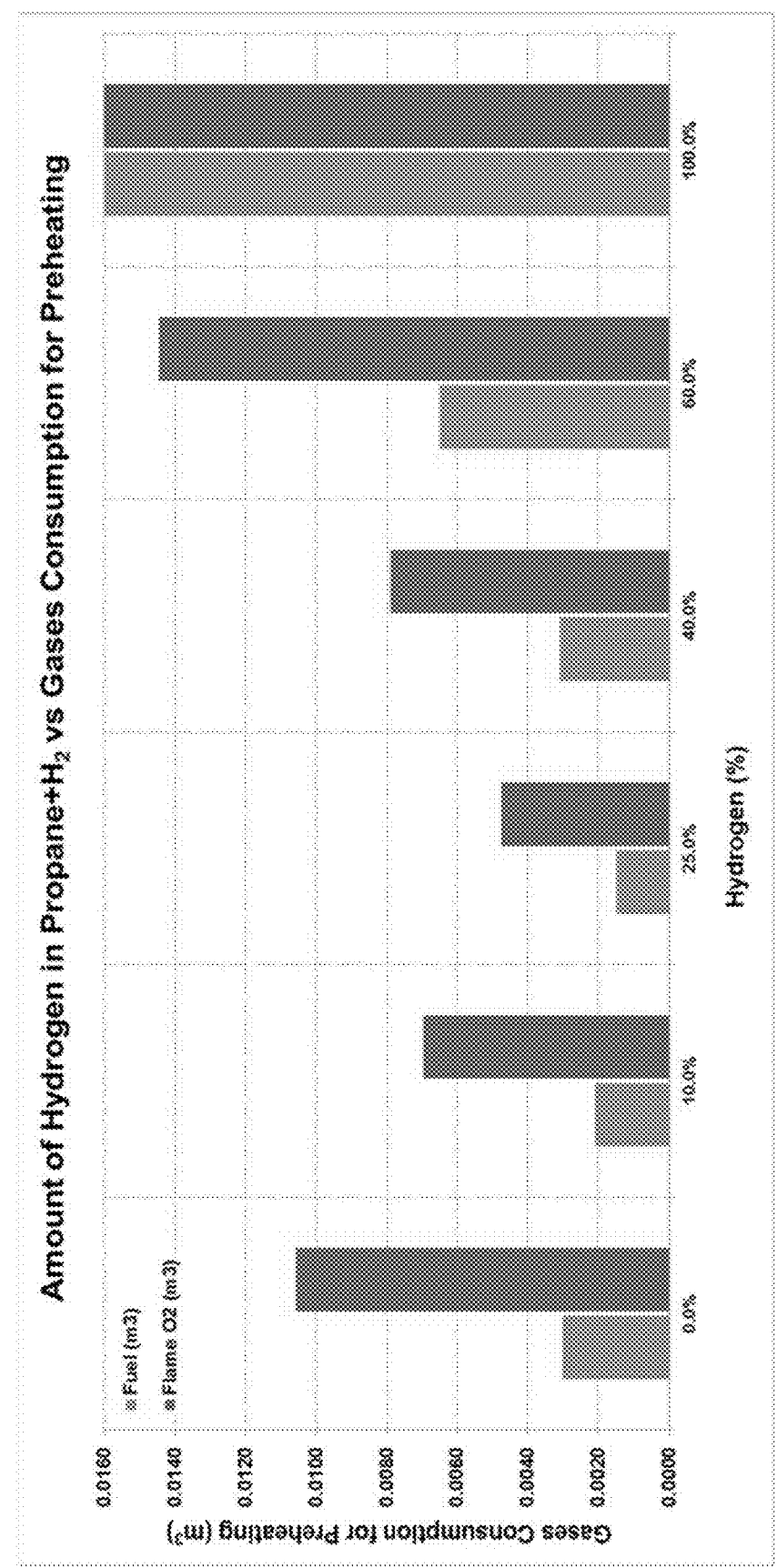
FIG. 6 shows the fuel and flame oxygen consumption during preheating tests for propane+hydrogen mixtures

According to the present disclosure, a graphic representation of the fuel and flame oxygen consumption for the $H_2$/Propane mixtures of interest is presented as FIG. 6. As shown in FIG. 6 and in Table 3, the flame oxygen consumption to preheat the ¾" thickness of carbon steel plate was 0.0106 m$^3$ for propane. However, by adding 10% hydrogen and 25% hydrogen, the actual flame oxygen consumption to achieve the preheating was substantially reduced to values of 0.0069 m$^3$ for 10% $H_2$/90% Propane and 0.0047 m$^3$ for 25% $H_2$/75% Propane.

Example 4

Ethane ($C_2H_6$) and Its Mixtures

Preheating tests were conducted using ASTM A36 carbon steel base metal to compare the preheating performance and flame oxygen consumption of gas mixtures comprising ethane with different amounts of hydrogen. The preheating time performance and the fuel and flame oxygen flowrates and consumption can be seen in Table 4.

Figure 7:
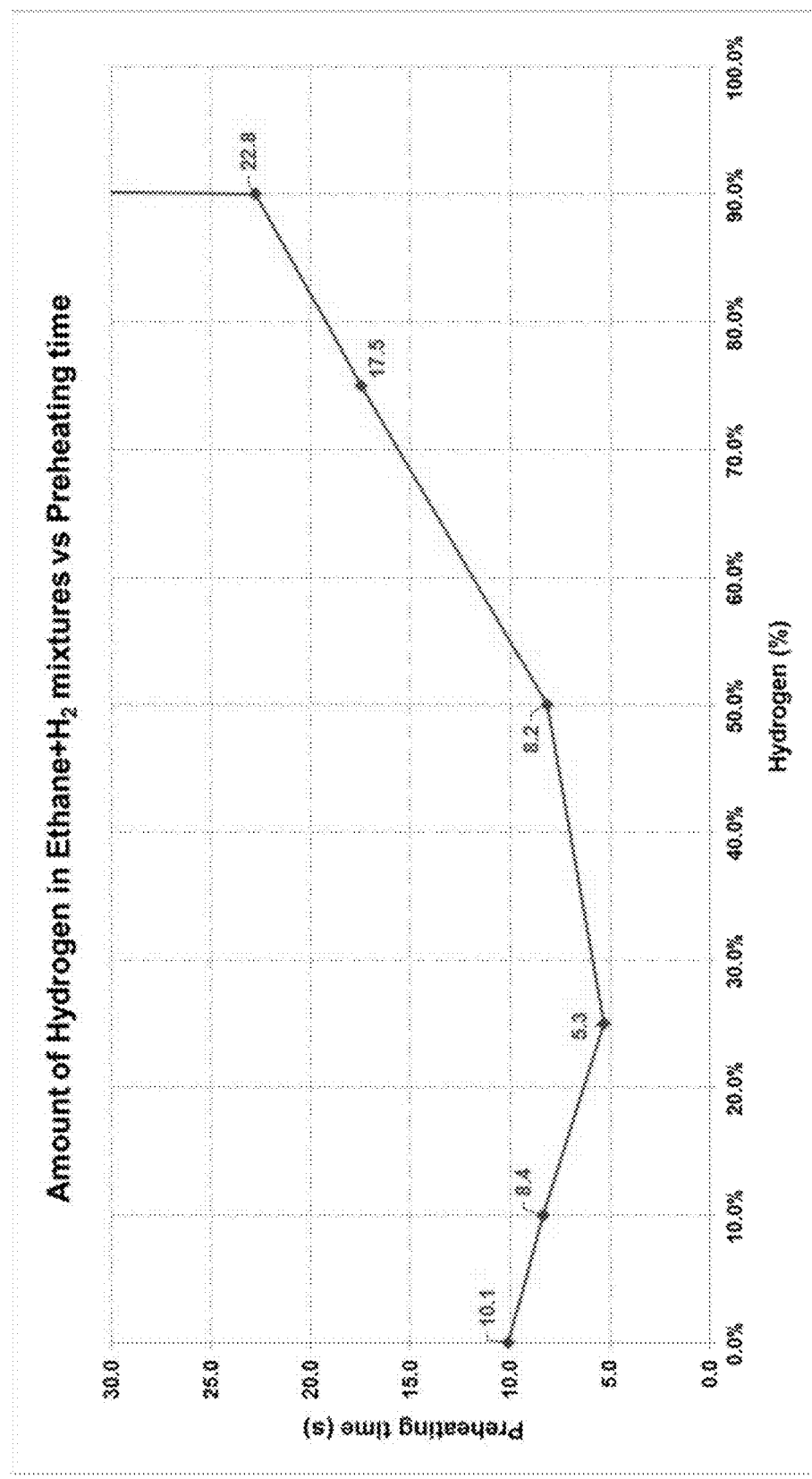
FIG. 7 shows the preheating time results for ethane+hydrogen mixtures.

According to the present disclosure, a graphic representation of the piercing time improvement through the increase in the hydrogen ($H_2$) used in the $H_2$/Ethane mixtures of interest is presented as FIG. 7. As shown in FIG. 7, as the amount of hydrogen in the mixture increases up to 50%, the preheating time decreases below that observed for the 100% ethane sample. The addition of 10% to 50% of hydrogen in ethane could reduce the preheating time in the range of 17% to 48%, confirming the superior efficiency of the heat transfer when hydrogen is mixed with a C2 hydrocarbon. The best performance was achieved when 25% of hydrogen was added to the mixture.

TABLE 4

| Fuel Gas Composition (vol. %) | | Preheating Parameters | | | | Gases consumption for preheating | |
| --- | --- | --- | --- | --- | --- | --- | --- |
| Ethane ($C_2H_8$) | Hydrogen ($H_2$) | Preheating time (s) | Fuel Flowrate (m$^3$/h) | Flame O$_2$ Flowrate (m$^3$/h) | Oxygen/Fuel Ratio | Fuel (m$^3$) | Flame O$_2$ (m$^3$) |
| 100.0% | 0.0% | 10.1 | 0.70 | 2.17 | 3.1 | 0.0020 | 0.0061 |
| 90.0% | 10.0% | 8.4 | 0.70 | 2.02 | 2.9 | 0.0016 | 0.0047 |
| 75.0% | 25.0% | 6.3 | 0.70 | 1.85 | 2.6 | 0.0010 | 0.0027 |
| 80.0% | 50.0% | 8.2 | 0.70 | 1.28 | 1.8 | 0.0016 | 0.0029 |
| 25.0% | 75.0% | 17.5 | 0.70 | 0.69 | 1.0 | 0.0034 | 0.0034 |
| 10.0% | 90.0% | 22.8 | 0.70 | 0.45 | 0.6 | 0.0044 | 0.0028 |
| 0.0% | 100.0% | 600.0 | 0.70 | 0.38 | 0.6 | 0.1167 | 0.0633 |

Figure 8:
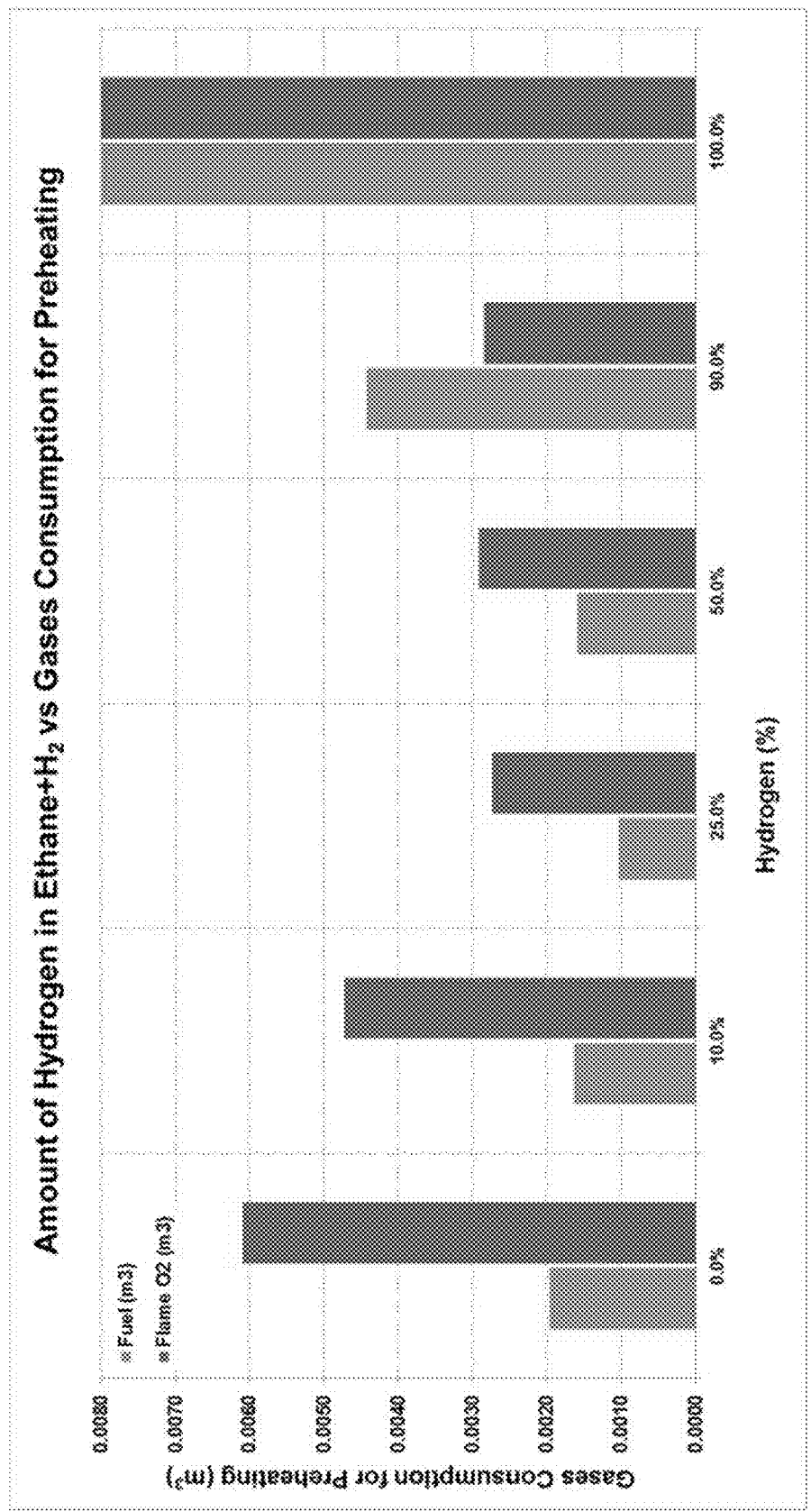
FIG. 8 shows the fuel and flame oxygen consumption during preheating tests for ethane+hydrogen mixtures

According to the present disclosure, a graphic representation of the fuel and flame oxygen consumption for the $H_2$/Ethane mixtures of interest is presented as FIG. 8. As shown in FIG. 8 and in Table 4, the flame oxygen consumption to preheat the ¾" thickness of carbon steel plate was 0.0061 m$^3$ for ethane. However, by adding 10% hydrogen to 50% hydrogen, the actual flame oxygen consumption to achieve the preheating was substantially reduced to values at the range of 0.0047 m$^3$ to 0.0027 m$^3$.

Example 5

Dimethyl Ether ($C_2H_6O$) and Its Mixtures

Preheating tests were conducted using ASTM A36 carbon steel base metal to compare the preheating performance and flame oxygen consumption of gas mixtures comprising dimethyl ether with different amounts of hydrogen. The preheating time performance and the fuel and flame oxygen flowrates and consumption can be seen in Table 5.

Figure 9:
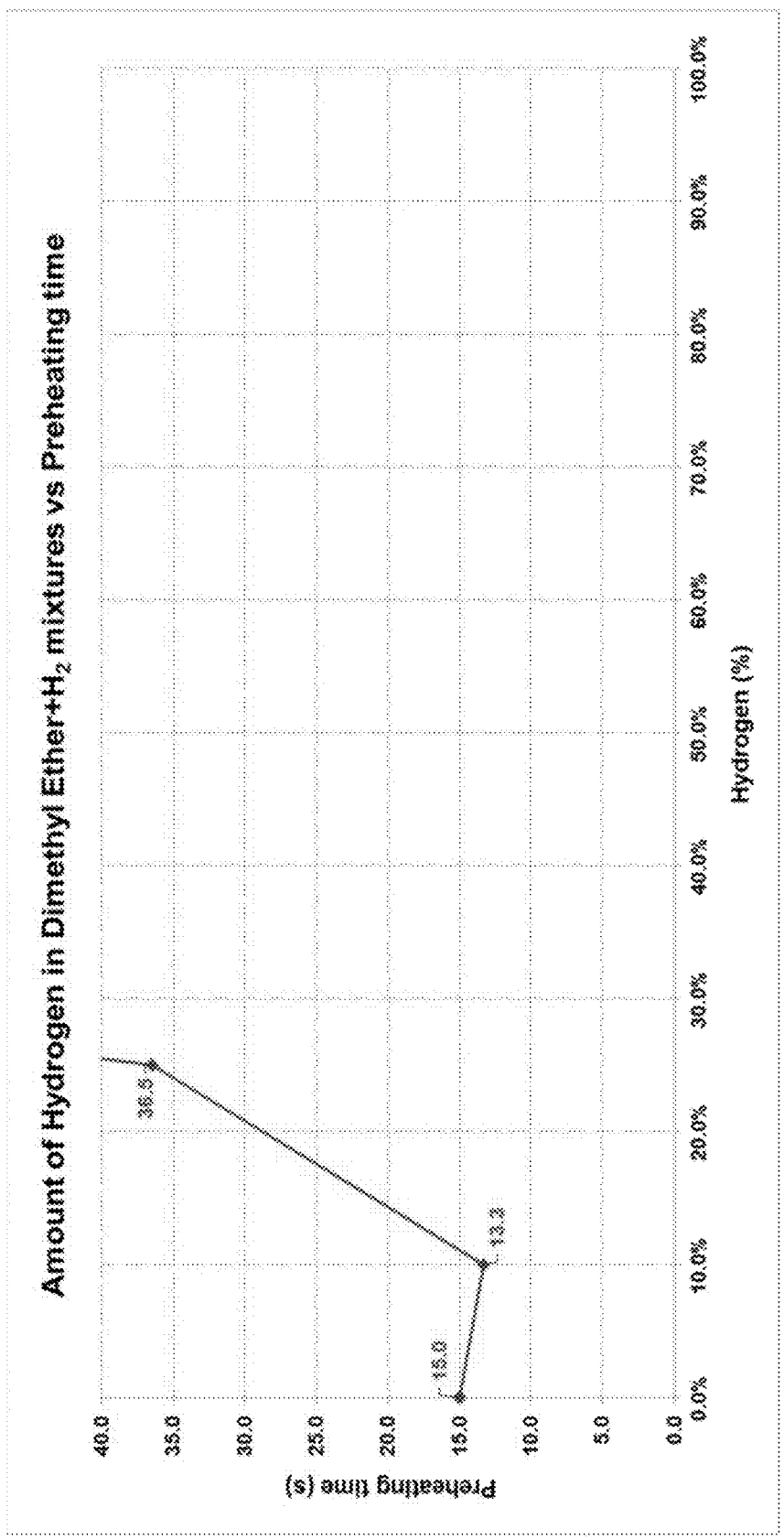
FIG. 9 shows the preheating time results for dimethyl ether+hydrogen mixtures.

According to the present disclosure, a graphic representation of the piercing time improvement through the increase in the hydrogen ($H_2$) used in the $H_2$/Dimethyl ether mixtures of interest is presented as FIG. 9. As shown in FIG. 9, as the amount of hydrogen in the mixture increases up to 10%, the preheating time decreases below that observed for the 100% dimethyl ether sample. The addition of 10% of hydrogen in dimethyl ether could reduce the preheating time in 11%, confirming the superior efficiency of the heat transfer when hydrogen is mixed with a C2 oxygenated hydrocarbon.

TABLE 5

| Fuel Gas Composition (vol. %) | | Preheating Parameters | | | | Gases consumption for preheating | |
|---|---|---|---|---|---|---|---|
| Dimethyl Ether ($C_2H_8O$) | Hydrogen ($H_2$) | Preheating time (s) | Fuel Flowrate ($m^3/h$) | Flame $O_2$ Flowrate ($m^3/h$) | Oxygen/Fuel Ratio | Fuel ($m^3$) | Flame $O_2$ ($m^3$) |
| 100.0% | 0.0% | 16.0 | 0.51 | 1.38 | 2.7 | 0.0021 | 0.0058 |
| 90.0% | 10.0% | 13.3 | 0.51 | 1.5 | 2.5 | 0.0019 | 0.0046 |
| 75.0% | 25.0% | 36.5 | 0.51 | 0.86 | 1.7 | 0.0052 | 0.0087 |
| 0.0% | 100.0% | 600.0 | 0.70 | 0.38 | 0.5 | 0.1167 | 0.0633 |

Figure 10:
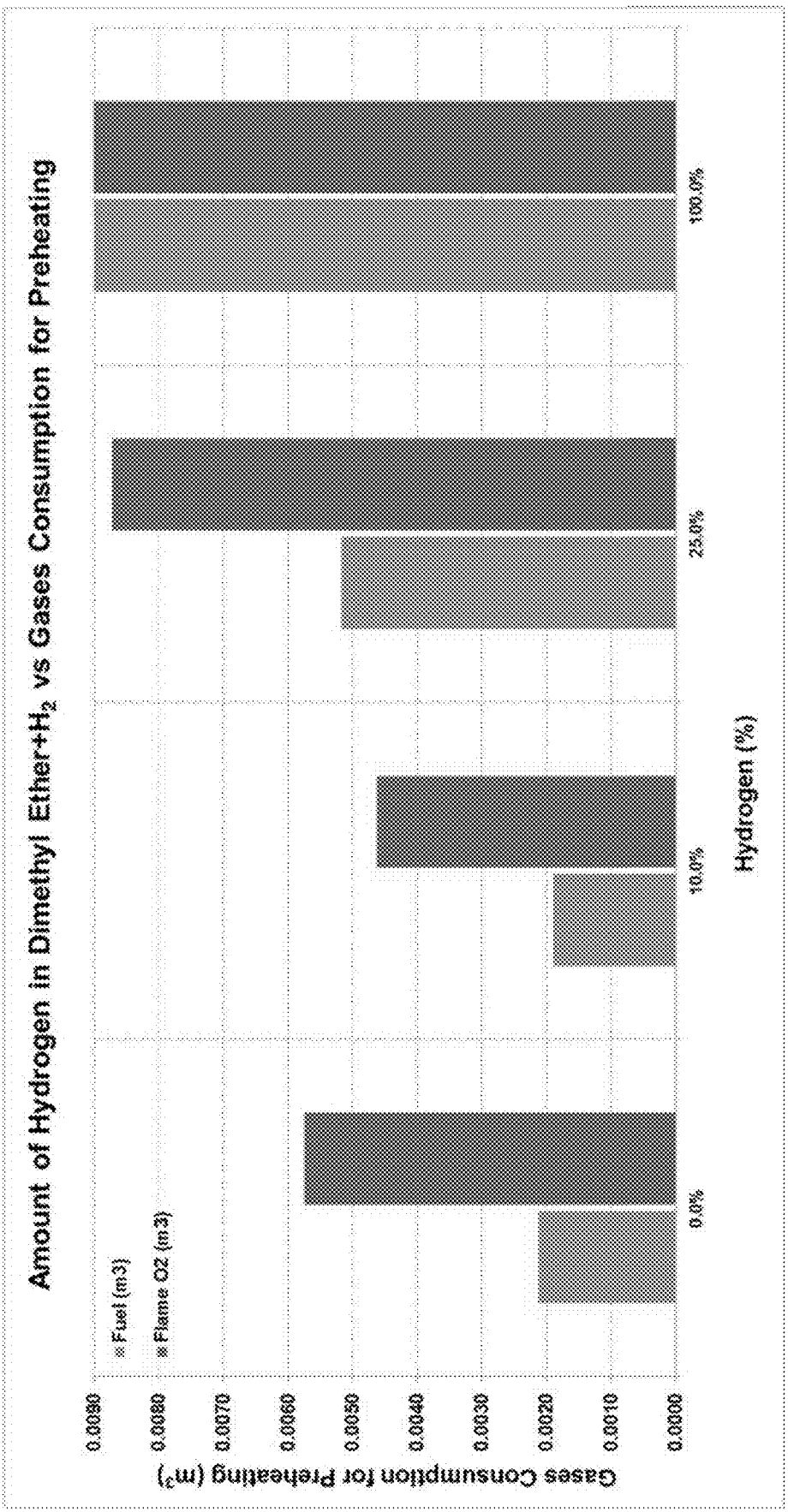
FIG. 10 shows the fuel and flame oxygen consumption during preheating tests for dimethyl ether+hydrogen mixtures

According to the present disclosure, a graphic representation of the fuel and flame oxygen consumption for the $H_2$/Dimethyl Ether mixtures of interest is presented as FIG. 10. As shown in FIG. 10 and in Table 5, the flame oxygen consumption to preheat the ¾" thickness of carbon steel plate was 0.0058 $m^3$ for dimethyl ether. However, by adding 10% hydrogen the actual flame oxygen consumption to achieve the preheating was substantially reduced to value of 0.0046 $m^3$.

The experiments above illustrate the viability of using the inventive methane/hydrogen mixtures as the oxy fuel gas in metal fabrication processes: cutting, welding, heating, soldering, or brazing.

The preheating experiments in which different amounts of hydrogen was added to C1 (Methane), C2 (Ethane) and C3 (Propane) hydrocarbons and $C_2$ (Dimethyl ether) oxygenated hydrocarbon confirm that the addition of hydrogen enhanced heat transfer efficiency from the oxyfuel flame to the base metal translating to a lower preheating time.

The oxyfuel cutting gas mixtures with the addition of hydrogen presented here minimize preheating time, minimize preheating oxygen and fuel gas consumption and minimize operating costs in oxyfuel processes, while being environmentally friendly and safe during storage, transportation and use.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. The scope of this invention includes equivalent embodiments, modifications, and variations that fall within the scope of the attached claims.

What is claimed is:

1. A method for heating a metal workpiece in a metal fabrication process, said method comprising:
   delivering a fuel gas mixture to a torch, the fuel gas mixture consisting essentially of:
   a 85-95% by volume natural gas; and from 5% to 15% hydrogen by volume;
   delivering oxygen to the fuel gas mixture to form an oxy-fuel gas mixture;
   igniting the oxy-fuel gas mixture to form a flame;
   contacting the flame to the metal workpiece at a predetermined location on the metal workpiece; and
   heating the metal workpiece.

2. The method of claim 1 wherein said metal fabrication process is selected from the group consisting of cutting, welding, flame heating, soldering and brazing.

3. The method of claim 2 wherein said metal fabrication process is welding.

4. A fuel gas mixture for an oxy fueled metal fabrication process, wherein said metal fabrication process is selected from cutting, welding, flame heating, soldering and brazing, said mixture consisting essentially of:
   85-95% natural gas by volume; and 5-15% hydrogen by volume.

5. The fuel gas mixture of claim 4 wherein said metal fabrication process is welding.

* * * * *